Dec. 1, 1970  YOSHICHIKA SAKAMOTO  3,543,426
FILM FILING PLATE

Filed May 31, 1968  9 Sheets-Sheet 1

INVENTOR
YOSHICHIKA SAKAMOTO
BY Young + Thompson
ATTORNEYS

Dec. 1, 1970  YOSHICHIKA SAKAMOTO  3,543,426
FILM FILING PLATE
Filed May 31, 1968  9 Sheets-Sheet 5

INVENTOR
YOSHICHIKA SAKAMOTO
BY Young & Thompson
ATTORNEYS

United States Patent Office 3,543,426
Patented Dec. 1, 1970

3,543,426
FILM FILING PLATE
Yoshichika Sakamoto, 214 2-chome, Sengen-cho,
Ohmiya, Japan
Filed May 31, 1968, Ser. No. 733,448
Claims priority, application Japan, Sept. 21, 1967,
42/60,143
Int. Cl. G09f *1/10*
U.S. Cl. 40—158
2 Claims

ABSTRACT OF THE DISCLOSURE

A film filing plate comprises a front cardboard, a back cardboard, and a heat-sensitive synthetic resin layer laminated on at least one of said front or back cardboards to facilitate bonding the cardboards together by heat sealing. Each cardboard has a plurality of through holes that register with each other, with the holes in the front cardboard larger than those in the back cardboard. The front cardboard has holding lugs formed on a pair of opposite edges of the front hole, one of the other edges of the front hole having therein a finger notch and the remaining edge of the front hole having a guide slope formed thereon that bends toward the back cardboard. A three-layer translucent membrane can be inserted between the front and back cardboards.

---

This invention relates to a film filing plate, more particularly to a film filing plate made of inexpensive cardboard to hold a plurality of mounted or non-mounted films in a lattice disposition in such a manner that each film can be projected in the state as held by the film filing plate.

The films to be filed in the film filing plate according to the present invention are photographic negative or positive films, negative films of Roentgen ray photograph, color or black-and-white slide transparencies mounted on glass or paper mounts, and the like. For simplicity, the film filing plate of the present invention will be described hereinafter referring to an embodiment for filing slide transparencies, but the invention is not limited to such embodiment, because it can be easily modified to receive various kinds of films by changing the gap between the front cardboard and the back cardboard.

A known film filing plate made of cardboard has been used heretofore for storing, sorting, inspecting, and viewing various transparencies, such as slide films and printing plates of color picture and such film filing plates are fabricated by bonding two or three punched cardboards with a suitable adhesives, such as aqueous glue, rubber dough, pressure-sensitive adhesives, etc.

The film filing plate made of cardboard has advantages in its medium thickness light weight, and moderate hardness, which make the handling of such film filing plates easier than with plastic filing plates. On the other hand, the film filing plate made of cardboard has the following disadvantages.

(1) Film filing plates made by using aqueous glue is very hygroscopic, and the glue applied to backside of film holding lugs readily absorbs moisture to become sticky or moldy. Theoretically, it is possible to apply glue only to those portions of the cardboard which are bonded tightly but not to the back side of holding lugs. Such selective glue application, however, is not practicable because it makes the manufacturing process too complicated.

(2) Rubber dough applied to the back side of the holding lugs presents extra resistance against movement of films being inserted or removed into or out of the filing plate, and smooth handling of the films is hampered. Selective elimination of rubber dough application to holding lugs is not practicable from the same reasons as the aqueous glue, as described in the last paragraph.

(3) When pressure sensitive adhesive is used, such adhesive is usually applied to the entire surface of the cardboard before punching. The pressure sensitive adhesive applied to the back side of the holding lugs remains as exposed after the filing plate is assembled, and tends to stick to the film being inserted or removed into or out of the film filing plate, and hence, the quality of film is degraded. Application of the adhesive by excepting the holding lugs is not practicable as in the case of aqueous glue and rubber dough.

(4) It is also possible to apply liquid vinyl on the cardboard to form a thin laminated layer on the cardboard, and then bond two such cardboards together by applying a high frequency voltage across the cardboards to be bonded. However, such process is not efficient, because there is produced a sizable voltage drop in proportion to the thickness of the cardboards.

(5) With any of the preceding adhesives, it is difficult to mount a milk-white translucent polyethylene membrane between cardboards constituting the film filing plate to facilitate direct inspection of the film.

According to the present invention, there is provided a film filing plate comprising two to three cardboards, in which at least one of the surfaces to be bonded is laminated or impregnated with polyethylene, so that said cardboards are bonded together by melting under pressure the polyethylene thus laminated or impregnated. The film filing plate according to the present invention has the following advantages.

(1) Cardboards can be bonded easily and quickly at a high efficiency, even when a plurality of cardboards are piled for bonding.

(2) The cardboards are bonded together securely and tightly.

(3) The film filing plates are moisture-proof and mold-proof. In a preferred embodiment, each film held on the film filing plate is protected by translucent membranes of adjacent film filing plates in a dust-proof, moisture-proof, and mold-proof fashion.

(4) The surface of polyethylene membranes to be used as adhesive is smooth, and hence, those portions of the polyethylene membrane which are left on the back of the holding lugs are free from moisture absorption, molds, and stickiness, which have been the disadvantages of conventional film filing plates.

For a better understanding of the invention, reference is made to the accompanying drawings, in which.

Like parts are designated by like symbols and numerals throughout the accompanying drawings.

Referring to FIGS. 1 to 5, a film filing plate, generally designated by F, comprises a front cardboard 1 having a plurality of rectangular through holes 2 bored thereon in a lattice disposition, and a back cardboard 3 having a plurality of through holes 4 bored thereon in a lattice disposition at the same pitch as that of rectangular holes 2 on the front cardboard 1. The holes 4 on the back cardboard are somewhat smaller than the rectangular holes 2 on the front cardboard. Heat-sensitive adhesive, such as polyethylene is applied on the lower surface of the front cardboard and upper surface of the back cardboard in a thin layer laminated or impregnated thereto. Each rectangular hole 2 on the front cardboard has a pair of holding lugs 5, 5' formed on the opposite edges of the hole. Each front cardboard having a thin layer of heat-sensitive adhesive 7 applied at the back thereof is put on a back cardboard, while registering the holes 2 and 4 with each other and placing the heat-sensitive adhesive layers face in face. Then, the front and back cardboards are bonded by heating them under pressure along lattice lines 1a with a heat-sealing device to be described hereinafter, so that the heat-sensitive adhesive, e.g. polyethylene, on both cardboards 1 and 3 are melted together. Thus, a film filing plate, as shown in FIGS. 1 to 4 is fabricated.

Figures 1, 2, 3:
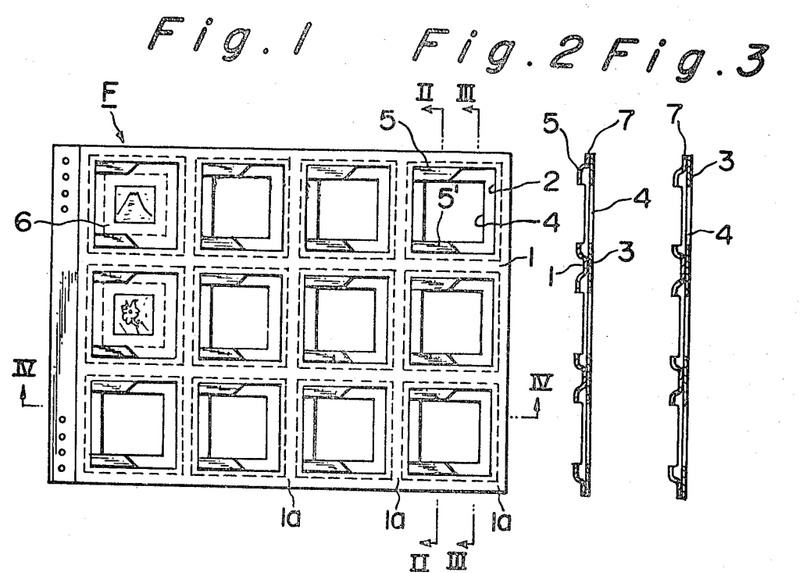
FIG. 1 is a plan view of a film filing plate embodying the present invention.
FIGS. 2 to 4 are sectional views of the film filing plate of FIG. 1, taken along the lines II—II, III—III, and IV—IV, respectively.
Figure 4:
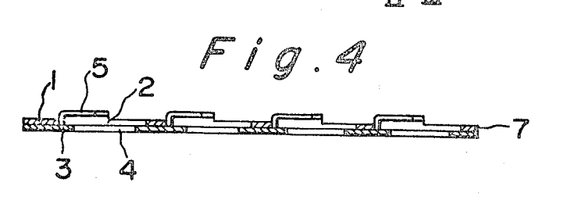
Figure 5:
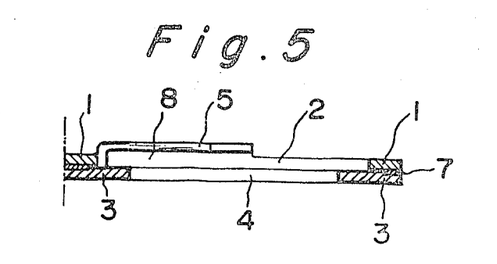
FIG. 5 is an enlarged partial sectional view of the right hand end of the film filing plate, as shown in FIG. 4.

FIG. 5 shows one of film receiving sections, on an enlarged scale. A receiving space 8 defined by the holding lugs 5, 5' and fringe portions of the rectangular hole 4 of the back cardboard 3 has openings through the holes 2 and 4. A film or a slide 6 is received by such space 8, as shown in FIG. 1. To insert or remove the slide 6 into or out of the space 8, it is slid underneath the lugs 5, 5'

Figure 6:
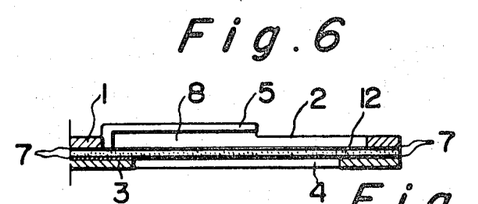
FIGS. 6 and 7 are partial sectional views similar to FIG. 5, illustrating different modifications, respectively.

FIG. 6 illustrates a modification of the film filing plate, in which a milk-white translucent membrane 12, which is made of the same heat-sensitive plastic material as the adhesives 7 applied to the cardboards 1 and 3, is sandwiched between the front and back cardboards. The translucent membrane 12 lies between the holes 2 and 4 to facilitate direct eye-sight viewing of the film placed thereon. Such translucent membrane 12 is bonded to both the front and the back cardboards 1 and 3 in the process of bonding the two cardboards, and hence, no additional step is necessary to fabricate this modification, as compared with the preceding embodiment.

Figure 7:
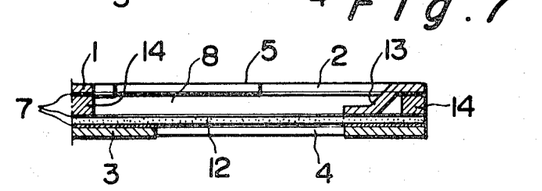
Figure 8:
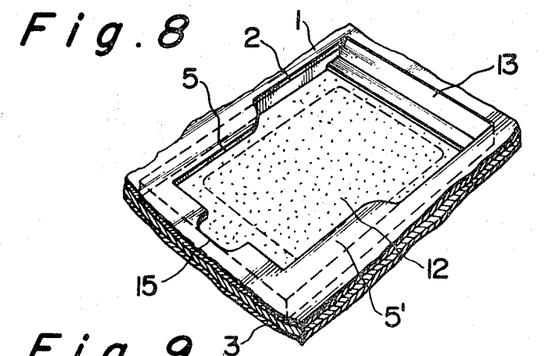
FIG. 8 is a partial perspective view of the film filing plate, as shown in FIG. 7.

FIGS. 7 and 8 show another modification of the embodiment of FIG. 1 in a sectional view and a perspective view, respectively. A spacer 14 is inserted between the front cardboard 1 and the back cardboard 3. One edge of the front hole 2 perpendicular to holding lugs 5, 5' is bent toward the back cardboard with a certain inclination and its tip end is secured to the back cardboard 3, so as to form a guide slope 13. The spacer 14 has about the same thickness as that of a slide or film to be received by the filing plate F, and it is, for instance, made of cardboard and shaped in a lattice form by punching a plurality of holes, larger than the holes 2 of the front cardboard 1, at the same pitch as the holes 1 and 2.

In order to insure bondage of the spacer 14 with the front cardboard 1 and the back cardboard 3, it is possible to laminate or impregnate heat-sensitive adhesive, e.g., polyethylene, in a thin layer. As shown in FIGS. 7 and 8, one edge of each hole, which is perpendicular to the holding lugs 5, 5', is so bent as to form a guide slope 13 to facilitate insertion and removal of a film or slide. A finger notch 15 is formed on the opposite edge to said guide slope for smooth and easy removal of the film or slide from the space 8 by placing a finger therein.

Figure 9:
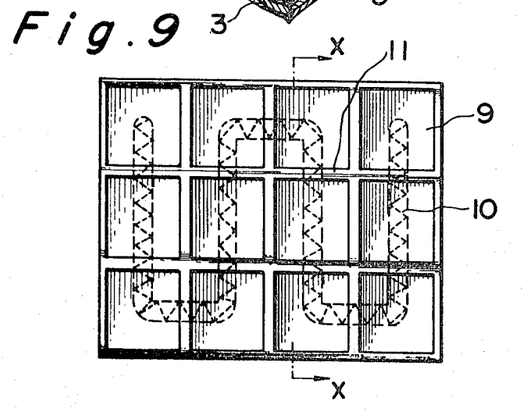
FIG. 9 is a plan view of a heat-sealing device usable for processing the film filing plates according to the present invention.
Figure 10:
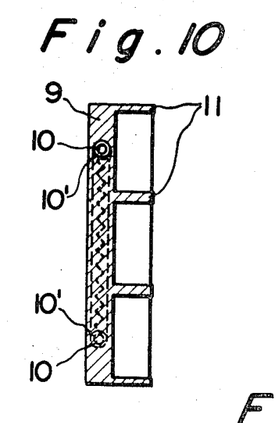
FIG. 10 is a sectional view of the heat-sealing device, taken along the line X—X of FIG. 9.

FIGS. 9 and 10 illustrate a heat-sealing device usable in manufacturing the film filing plates F according to the present invention. With the device, the front and back carboards 1 and 3 are bonded together, possibly simultaneously with a spacer 14 and a translucent membrane 12, by heating and pressing them along lattice lines 1a. The device has a metallic base plate 9 having a hole 10' to receive a heating wire 10, and a lattice-shaped heating edge 11 issuing from the base plate 9. The tip end of the lattice-shaped heating edge 11 corresponds to the lattice line 1a along which the front and the back cardboards are bonded together. To manufacture the film filing plate F with this device, at first the cardboards 1 and 3, possibly the spacer 14 and the translucent membrane 12 sandwiched therebetween, are piled while registering the windows 2 and 4, and then the tip end of a preheated lattice-shaped heating edge 11 is applied with pressure to the cardboards thus piled to melt and unite the heat-sensitive adhesive applied thereon.

Each film filing plate F described hereinbefore is adapted to hold a plurality of slides 6 in a lattice disposition on a plane. The thickness of the slide to be held by such film filing plate varies considerably depending on the type of the mount used for mounting transparencies; namely, paper mounted slides are thin, while glass-mounted slides are thick. In the preceding embodiments, those film filing plates which are adapted to receive thin slides cannot receive thick slides because of the narrow spacing between the front and back cardboards, while those designed for receiving thick slides cannot hold thin slides securely and thin slides tend to slip out of such film filing plates. In the following embodiments, such difficulties are obviated by providing a special elastic lip in each receiving space of the film filing plate, so that both thin and thick slides can be securely held by the filing plate.

Figure 11:
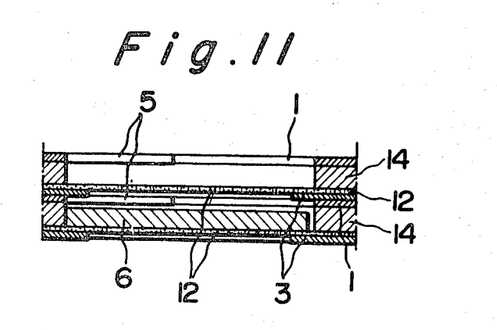
FIG. 11 is a partial sectional view of two film filing plates compiled in an album fashion.

With the film filing plates according to the last mentioned embodiment of the present invention, each film can be stored in a moisture-proof, dust-proof, and mold-proof manner. Referring to FIG. 11, a film 6, held by such film filing plate F, is completely enclosed by the filing plates; namely by a translucent membrane 12 supporting the film and another translucent membrane 12 of an adjacent filing plate, which sandwich the film from the above and below, and by the spacer of the film supporting filing plate which surrounds the four sides of the film.

Figures 12, 13, 14:
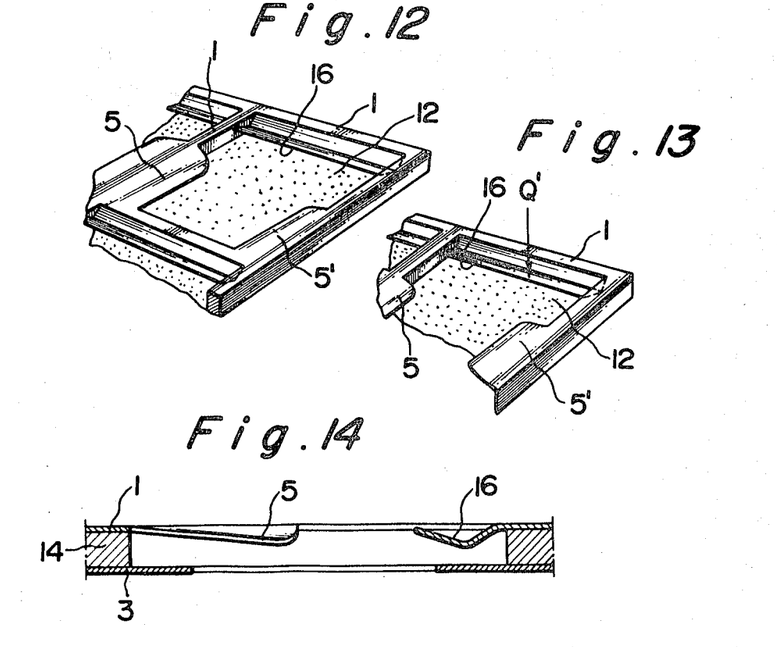
FIGS. 12 and 13 are partial perspective views of another embodiment of the invention.
FIG. 14 is an enlarged partial section view of the film filing plate, as shown in FIG. 13.
Figure 16:
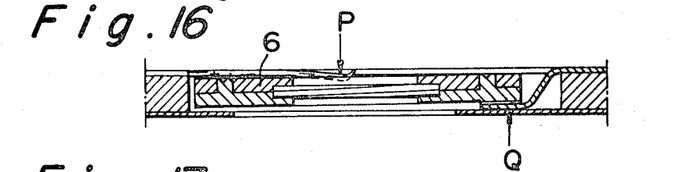
FIGS. 16 and 17 are sectional views of a film filing plate according to the present invention, holding a thick and thin mounted slide, respectively.
Figure 17:
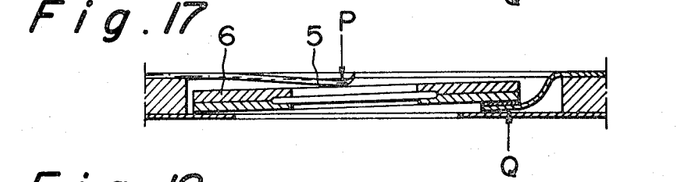

Referring to FIG. 12, a special elastic lip 16 is formed on one edge of each window of the front cardboard 1. When the window is empty with no slide inserted therein, the free end of the elastic lip 16 is held at its raised position, as shown in FIG. 12. On the other hand, if a slide is inserted therein, the elastic lip is pushed down, as shown in FIG. 13. If a very thick slide, like a glass-mounted slide, is inserted in the receiving space of the film filing plate, the elastic lip 16 is pressed downwards to its lowest position, as shown in FIG. 16. The slide is held securely at a position wherein an upward force Q of the lip 16 balances a downward force P of the holding lugs 5, 5'. On the other hand, if a thin slide, such as a paper-mounted slide, is held by the film filing plate of FIG. 12, the elastic lip 16 is not pressed down to the lowest position, but only to an intermediate position, as shown in FIG. 17, and the thin slide is securely held at the position where the two forces P and Q balance each other. It should be noted here that the holding lugs 5, 5' are preferably made of a suitable elastic material, and slightly bent downwards, as shown in FIG. 14.

Figure 15:
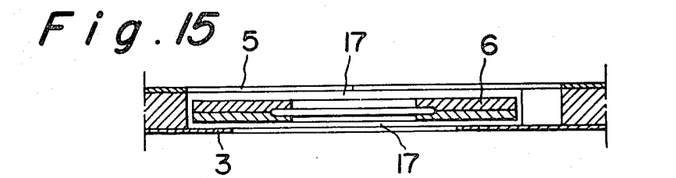
FIG. 15 is a sectional view of a conventional file plate.

For comparison, FIG. 15 shows a thin mounted slide held by a conventional filing plate for receiving thick slides, for instance a filing plate designed for holding glass-mounted slides. It is apparent from FIG. 15 that such thin slides tends to slip out of the filing plate, because there is produced a large gap 17 between the filing plate and the slide 6. In this case, the filing plate does not satisfactorily fulfil its purpose.

Figure 18:
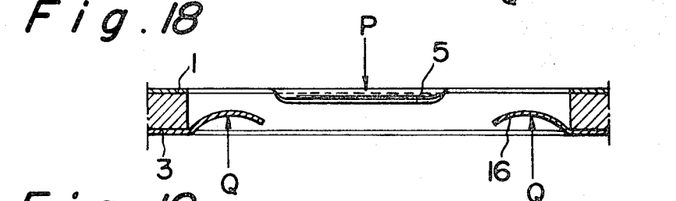
FIG. 18 is a sectional view of another embodiment of the present invention.

FIG. 18 shows a modification, in which a back cardboard 3 also has a pair of elastic lips 16, 16' provided on opposite edges thereof. With such filing plate, even a thin slide can be held in parallel with the filing plate F without slanting, as shown in FIG. 17.

In view of the fact that the thickness of slide varies considerably depending on the type of mount, it is very convenient and economical to provide a filing plate capable of holding securely both thin and thick mounted slides.

Figure 28A:
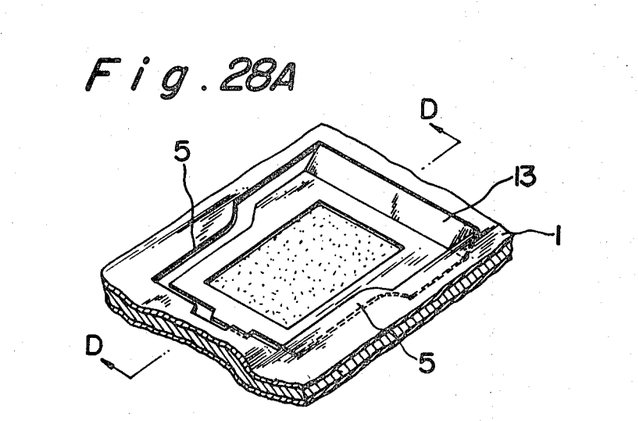
FIGS. 28A to 28E are diagrammatic illustrations of an embodiment of the film filing plate of the invention, in perspective, sectional, and plan views.
Figure 28B:
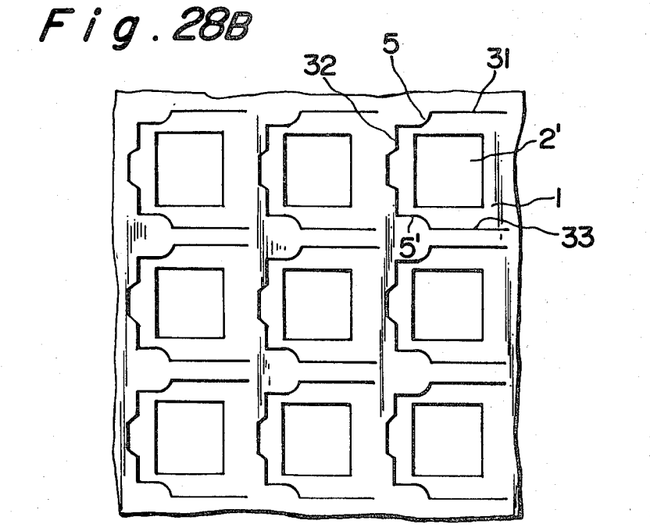
Figure 28C:
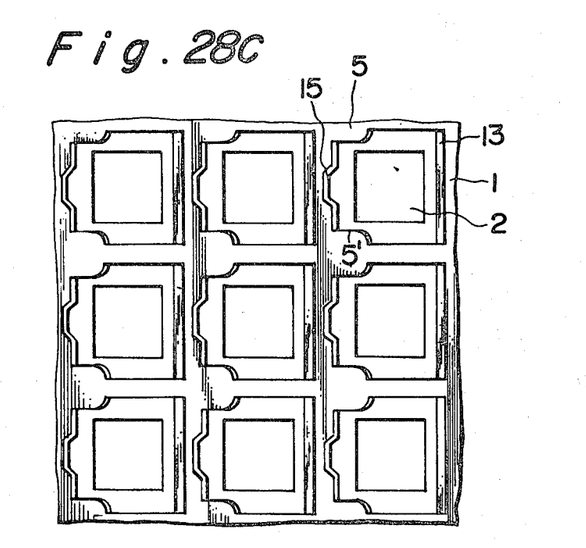
Figure 28D:
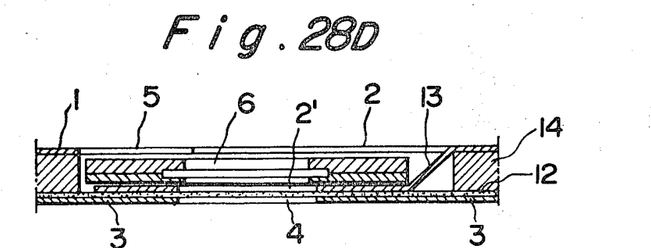

FIG. 28A shows, in a perspective view, another modification for holding slides in parallel with a filing plate F. FIG. 28B is a plan view of a front cardboard before being assembled with a back cardboard, and FIG. 28C is a plan view of the front cardboard after being fabricated as a finished filing plate. Referring to FIG. 28B, a plurality of through holes 2', each being substantially the same in size and pitch as the holes 4 on a back cardboard 3, are bored on the front cardboard 1, and three linear cuts 31, 32, and 33 are formed along three sides of each through hole 2'. The left hand end of the upper linear cut 31 is communicated with the corresponding left hand end of the lower linear cut 33 through the cross linear cut 32. Thus, each through hole 2' has fringes surrounding the three sides thereof. In fabrication, the fringes are bent toward the back cardboard 3 along a non-cut line connecting right hand ends of the upper and lower cuts 31 and 33, in such a manner that the through hole 2' is registered with the corresponding hole 4 on the back cardboard 3. As shown in FIG. 28D, a sectional view taken along the line D—D of FIG. 28A, a guide slope 13 is formed by using the extreme right hand end portion of the fringes, and the remaining portions of the fringes are bonded to the translucent membrane 12 by heat-sealing.

Figure 28E:
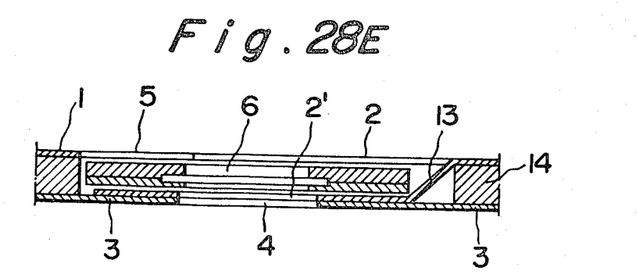

It is, of course, possible to bond the fringes to the back cardboard 3 directly, if such translucent membrane 12 is not used. Holding lugs 5, 5' are formed along the cuts 31 and 33, while a finger notch 15 is provided along the cut 32 for facilitating the insertion, and removal, of a film or slide into, and out of, the filing plate F. It is preferable to form a guide slope 13 between the hole 2 of the front cardboard and the non-cut line, connecting the right hand ends of the linear cuts 31 and 33, to insure smooth movement of the slide or film to be held by the filing plate F. As shown in FIG. 28D, according to this embodiment of the present invention, each film or slide 6 is held in parallel with the translucent membrane 12 by means of the fringes around the hole 2, which are heat sealed to the membrane 12. When the film filing plate F is used with a projector to hold the filing plate horizontally, the parallelism between the slide 6 and the translucent membrane 12 is very important. Of course, if the translucent membrane 12 of the filing plate F is dispensed with, as shown in FIG. 28E, the slide 6 is held in parallel with the back cardboard 3.

In a known film filing plate, such translucent membrane 12 is applied to the filing plate F by glue or other adhesive, while spreading the membrane uniformly to all directions, and then the glue or adhesive is dried at the room temperature. Membranes for this purpose have been made of cellophane, paraffin paper, vinyl chloride, or the like. Such conventional translucent membrane has disadvantages in that it tends to wrinkle after being dried to make the product defective, and hence, its production cost is high. In order to avoid such wrinkle completely, each membrane has to be spread carefully either manually or by a precision mechanism, which results in an increased cost due to additional manual labor or an extra provision of special spreading mechanism.

According to the present invention, such difficulties of conventional translucent membranes are obviated by using a three layer membrane made of a cellophane core sheet laminated with heat sensitive synthetic resin adhesive layers on both sides thereof. The three layer membrane is inserted between the front cardboard 1 and the back cardboard 3, bonded to the cardboards by heat sealing after spreading it taut, and thereafter the filing plate is annealed by hot air for a certain period at a certain temperature. As a result of various tests, it has been found that the aforesaid annealing time and temperature can vary considerably depending on the molecular weight and crystallinity of polyethylene. In the case of polyethylene having a suitable molecular weight, the preferable annealing temperature is 60 to 90° C. and the annealing time can be comparatively short. With the three layer membrane thus bonded, wrinkles produced during the adhering process, due to various reasons, disappear in the process of the aforesaid annealing by hot air and the succeeding cooling. Furthermore, a suitable tension is generated on the membrane to spread it taut in a perfect plane. Moreover, in the three layer membrane of the invention, the high water-proofness and flexibility of polyethylene membrane layers compensate the poor water-proofness and stiffness of cellophane core sheet in a cumulative manner, accordingly, the excellent mechanical strength and water-proofness of the three layer membrane are insured.

Figure 19:
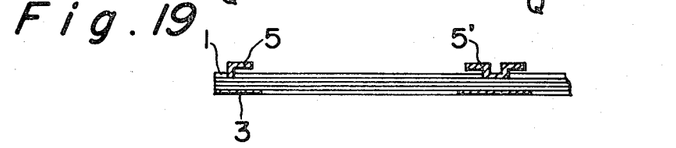
FIG. 19 is a sectional view of a film filing plate according to the present invention, which has a translucent cellophane paper sandwiched between the front and back cardboards.
Figure 20:
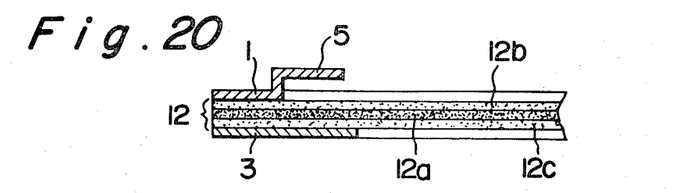
FIG. 20 is an enlarged partial sectional view of the film filing plate, as shown in FIG. 19.

FIGS. 19 and 20 are partial sectional views, illustrating the details of a film filing plate using such three layer membrane. A milk-white translucent membrane 12, which is sandwiched between the front cardboard 1 and the back cardboard 3 by heat sealing, comprises a cellophane core sheet 12a and polyethylene layers 12b and 12c laminated on the upper and lower surfaces of the cellophane core. Such three layer translucent membrane facilitates the illumination of films or slides held by the filing plate with milk-white light. Thus such films and slides can be directly inspected.

Figure 21:
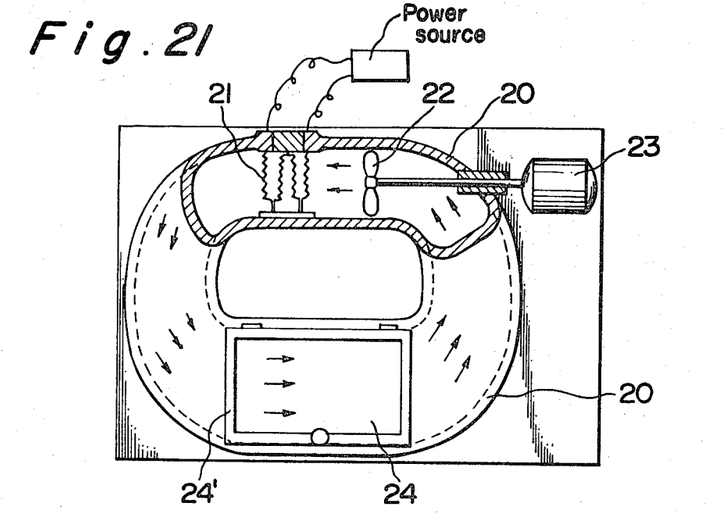
FIG. 21 is a plan view of a forced-air-heating device usable in a process of manufacturing the film filing plate according to the present invention.
Figure 22:
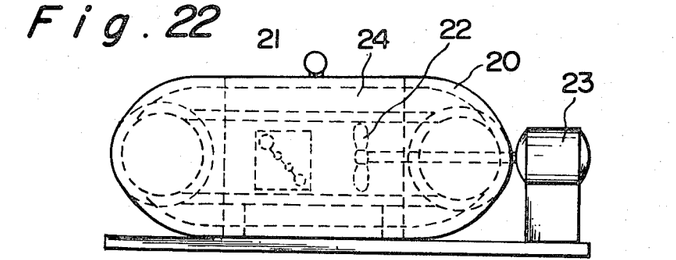
FIG. 22 is a side elevation of the forced-air-heating device.
Figure 23:
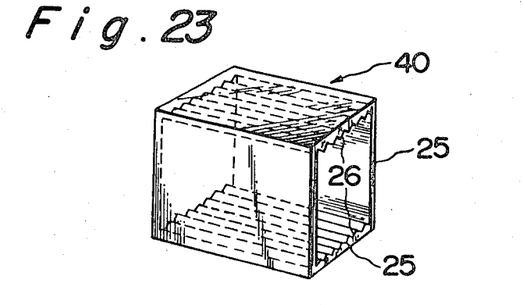
FIG. 23 is a schematic perspective view of a carrier to carry a plurality of film filing plate inserted therein and to be used in conjunction with the forced-air-heating device.

FIGS. 21 to 23 show an example of the forced air heating device usable for annealing the film filing plate fabricated according to the present invention. The heating device comprises an annular cylinder 20 made of heat insulating material for forced air circulation, heating wires 21 disposed across the air passageway within the cylinder 22, and a fan 22 mounted in the air passageway and driven by a motor 23 to force the heated air through the annular cylinder. A rectangular heating chamber 24 is formed at a suitable portion of the annular cylinder 20, and a removable glass lid 24' is provided at the top of the heating chamber to allow inspection of the inside space of the chamber. A carrier box 40 to carry a plurality of film filing plates F, which facilitates loading and unloading of the film filing plates F into and out of the heating chamber 24, comprises four rectangular boards 25 defining a square air passageway. A plurality of triangular grooves 26 are formed on the inner surfaces of the top and bottom rectangular boards to guide and hold film filing plates F to be inserted therein. The inventor has succeeded in producing the aforesaid three layer membrane 12 with suitable tension by heating the film filing plates F in the heating chamber 24 for a certain period of time and then cooling them at room temperature. By heating, the moisture in the cellophane core sheet is expelled, and at the same time the cellophane layer is shrunk. Such moisture expellation and shrinkage enable the taut and flat mounting of the three layer membrane.

A part of the moisture expelled from the cellophane sheet passes to the outside through the polyethylene membranes softened by heating, while another part of the expelled moisture suspends within the polyethylene membrane as fine foams, which stay affixed therein after the polyethylene membranes are cooled. As being cooled, the core layer shrinks again to cause shrinkage of the softened polyethylene layers bonded thereto. Thus, a suitable tension is spread throughout the translucent three layer membrane to eliminate the wrinkles and wavings of the cellophane core sheet. In this case, the softened polyethylene layers are hardened after the aforesaid shrinkage, without causing any wrinkles thereon, and hence, the entire three layer membrane is made completely wrinkle free. After being cooled from a high temperature for heat treatment, the polyethylene layers above and below the cellophane core sheet become moisture-proof to prevent swelling of the cellophane core layer by moisture absorption.

The purpose of the present invention can be fulfilled by using any membranes which shrink upon heating. Therefore, the two layers to be laminated on both surfaces of the core sheet are not limited to polyethylene alone. Moreover, the same effects can be achieved by using a single layer of vinyl chloride to be shrunk by heating.

By using such three layer translucent membranes, the process of manufacturing the film filing plate is simplified, while improving the yield thereof. Thus, excellent products can be manufactured quickly and accurately at a low cost.

In the preceding embodiments described hereinbefore referring to FIGS. 7, 8, 15, and 17, a spacer 14 is used, and in a filing plate to receive thick mounted slides, it is preferable to use spacers of suitable thickness. When cardboards are used for spacers, a plurality of such cardboards are piled upon each other, so that holes of the same configuration can be bored on them in one stroke, for the purpose of mass production. Since the increased thickness of the cardboards present high resistance to the edge of cutting tools to accelerate its wear and tear, so as to reduce gradually the efficiency of the cutting operation. Such difficulties can be obviated by using spacers made of easily cuttable elastic material.

If such elastic spacer is used, films or slides of different thickness can be held securely by a single film filing plate, because the gap between the front and the back cardboards can be easily modified by the elasticity of such spacer, so as to fit the particular thickness of the film or slide inserted therein.

Moreover, if foamable synthetic resin sheets made by compression molding, such as foamable styrene papers, are used as the material for the spacer, the efficiency of the cutting of holes on the piled spacers can be improved by compressing them with pressure. The spacers can be foamed to provide the desired thickness, after completing the fabrication of the filing plate. Thus, the total thickness of the spacers to be cut in each cutting stroke is greatly reduced to improve life of the cutting tool and reduce the cost of the process. The foaming or expansion of the spacer can be done either after or during fabrication of the film filing plates.

The easily cuttable elastic materials usable for the spacer are usually non-hygroscopic, and hence, the film filing plates made of such elastic materials are free from warps and wrinkles due to moisture absorption, and the film or slide can be stored under ideal dry conditions.

Figures 24, 26:
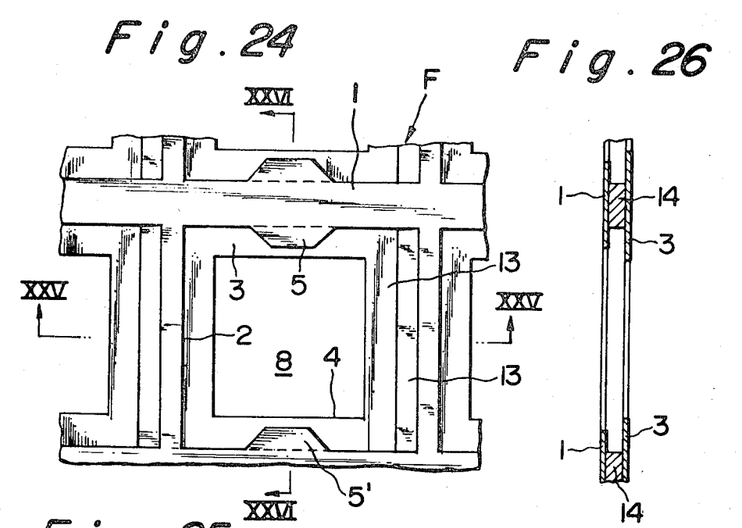
FIG. 24 is a partial plan view of a film filing plate according to the present invention, in which an elastic spacer is used.
FIGS. 25 and 26 are sectional views of the film filing plate of FIG. 24, taken along the line XXV—XXV and XXVI—XXVI thereof, respectively.
Figure 25:
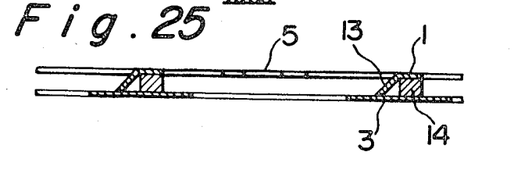
Figure 27:
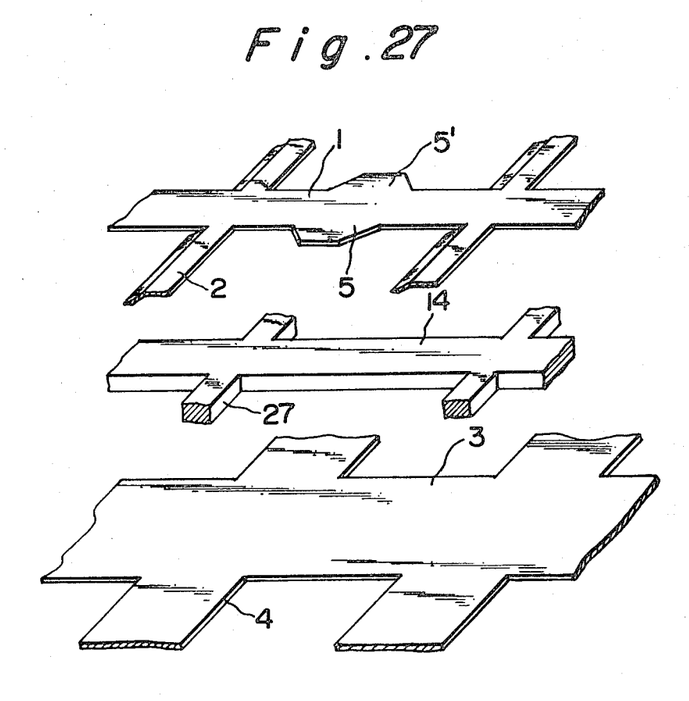
FIG. 27 is a diagrammatic illustration of a front cardboard, a spacer, and a back cardboard, of the film filing plate of FIG. 24.

Referring to FIGS. 24 to 26, a spacer 14 is made of porous foamable synthetic resin sheet, such as foamable styrene sheet, and square holes 27 are cut away from the sheet in a lattice disposition at the same pitch as the holes 2 of the front cardboard. Such cutting of the holes 27 is done in one stroke on a plurality of spacers 14 piled upon each other and kept under pressure. Each such hole 27 is substantially larger than either of the holes 2 and 4 of the front and back cardboards, as shown in FIG. 27. Each spacer thus prepared is then inserted between the front and back cardboards and bonded thereto. The elastic spacer is foamed or expanded either during or after the bonding. According to the results of test made by the inventors, the spacer can preferably be expanded by the heat used for heat sealing the spacer to both the front and back cardboards. By using a suitably designed heat-sealing device, the thickness of the expanded film filing plate can be easily adjusted to the desired value.

With the filing plate thus formed, a slide or film is inserted into a receiving space 8 along a guide slope 13, and the thickness or depth of the receiving space 8 is adjusted automatically by the elasticity of the spacer 14, so that the slide or film 6 is held securely by the back cardboard 3, and holding lugs 5, 5'. The removal of the slide or film out of the receiving space 8 can be also done easily and smoothly along the guide slope 13.

In the last mentioned embodiment of the present invention, the thickness or the depth of each receiving space 8 defined by rectangular holes 2, 4, and 27 can be individually adjusted by the elastic deformation of the spacer 14, so as to hold a film or slide of different thickness therein without causing excessive deformation of the holding lugs 5, 5'. By using foamable styrene sheet as the material for the spacer 14, the wear and tear of cutting tool of the spacer can be reduced greatly by carrying out the cutting operation on the spacers piled under pressure, because the thickness of each spacer is reduced by the pressure.

Furthermore, the spacer material having very low moisture absorbing power can be used to prevent warps and wrinkles of the film filing plate, and accordingly the film or slide can be stored in an ideal dry condition.

Although the present invention has been described referring to particular embodiments thereof, it is apparent to those skilled in the art that a number of modifications in details can be made without departing from the spirit and the scope of the invention. For instance, by narrowing the gap between the front and back cardboards, non-mounted films, such as bare Roentgen ray films, can be stored in an orderly fashion. Films and slides of various dimensions can be filed on the filing plate by changing the dimensions and dispositions of the holes arranged in a lattice disposition.

What I claim is:

1. A film filing plate, comprising a front cardboard, a back cardboard, a plurality of front holes in the front cardboard in a lattice disposition, a plurality of back holes in said back cardboard at the same pitch as said front holes, a heat-sensitive synthetic resin adhesive layer laminated on at least one of said front and back cardboards and provided with holes corresponding to the front and back holes, each said back hole being larger than said front hole, a pair of holding lugs formed on a pair of opposite edges of each front hole, a guideslope formed along one edge of said front hole perpendicular to the edges having said holding lugs by bending said one edge towards said back cardboard, and a finger notch in an edge of said front hole opposite to said one edge, said front cardboard being bonded by heat-sealing to said back cardboard with the adhesive layer held therebetween and with the front holes registered with the back holes.

2. A film filing plate according to claim 1 and further comprising a milk-white translucent sheet tautly spread between the back cardboard and the heat-sensitive resin adhesive layer, which translucent sheet consists of a cellophane core layer and two thin layers of heat-sensitive synthetic resin adhesive coated on both sides of the cellophane core layer, whereby upon heat-bonding of the translucent layer to the back cardboard and the heat-sensitive resin adhesive layer, the translucent sheet is tautly spread by means of the elasticity of the cellophane core layer while preventing moisture absorption of the cellophane core by the two thin layers of heat-sensitive synthetic resin adhesive.

References Cited
UNITED STATES PATENTS

| | | | |
|---|---|---|---|
| 2,385,541 | 9/1945 | Rinn | 40—158 |
| 2,757,471 | 8/1956 | Vlock | 40—158 |
| 2,828,567 | 4/1958 | Shoan. | |
| 2,888,762 | 6/1959 | Westphal. | |
| 2,963,809 | 12/1960 | Parker | 40—158 |
| 2,968,882 | 1/1961 | Ozeki | 40—106.1 |

EUGENE R. CAPOZIO, Primary Examiner

W. J. CONTRERAS, Assistant Examiner